United States Patent
Yamamoto

(10) Patent No.: US 8,812,230 B2
(45) Date of Patent: Aug. 19, 2014

(54) NAVIGATION DEVICE

(75) Inventor: Takeshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 244 days.

(21) Appl. No.: 13/262,117

(22) PCT Filed: Jun. 10, 2009

(86) PCT No.: PCT/JP2009/002623
§ 371 (c)(1),
(2), (4) Date: Sep. 29, 2011

(87) PCT Pub. No.: WO2010/143228
PCT Pub. Date: Dec. 16, 2010

(65) Prior Publication Data
US 2012/0022788 A1    Jan. 26, 2012

(51) Int. Cl.
*G01C 21/32* (2006.01)
(52) U.S. Cl.
USPC .......................... 701/451; 701/453; 705/14.63
(58) Field of Classification Search
None
See application file for complete search history.

(56) References Cited

U.S. PATENT DOCUMENTS

| | | | | |
|---|---|---|---|---|
| 5,289,572 A * | 2/1994 | Yano et al. | ...................... | 715/855 |
| 5,568,390 A * | 10/1996 | Hirota et al. | .................... | 701/410 |
| 5,648,769 A * | 7/1997 | Sato et al. | ....................... | 701/532 |
| 5,887,269 A * | 3/1999 | Brunts et al. | ................... | 701/486 |
| 5,948,040 A * | 9/1999 | DeLorme et al. | .............. | 701/467 |
| 6,385,622 B2 * | 5/2002 | Bouve et al. | .................... | 701/461 |
| 6,411,899 B2 * | 6/2002 | Dussell et al. | ................. | 701/468 |
| 6,738,711 B2 * | 5/2004 | Ohmura et al. | ................ | 701/451 |
| 6,826,473 B1 * | 11/2004 | Burch et al. | .................... | 701/467 |
| 7,049,981 B2 * | 5/2006 | Behr et al. | ...................... | 701/453 |
| 7,136,748 B2 * | 11/2006 | Umezu et al. | .................. | 701/451 |
| 7,146,274 B2 * | 12/2006 | Linkohr | ......................... | 701/453 |
| 7,409,221 B2 * | 8/2008 | Obradovich et al. | .......... | 455/457 |
| 7,769,541 B2 * | 8/2010 | Watanabe | ....................... | 701/453 |
| 7,890,255 B2 * | 2/2011 | Ikeuchi et al. | .................. | 701/450 |
| 7,941,753 B2 * | 5/2011 | Meisels et al. | ................. | 701/532 |
| 8,027,784 B2 * | 9/2011 | Geelen | ........................... | 701/437 |
| 8,108,083 B2 * | 1/2012 | Kameyama | .................... | 701/538 |
| 8,423,291 B2 * | 4/2013 | Geelen | ........................... | 701/454 |
| 8,433,513 B2 * | 4/2013 | Goel | .............................. | 701/453 |
| 8,457,895 B2 * | 6/2013 | Hong et al. | .................... | 701/540 |

(Continued)

FOREIGN PATENT DOCUMENTS

DE     4033829 A1     4/1991
DE    10009727 A1     9/2001

(Continued)

*Primary Examiner* — Helal A Algahaim
*Assistant Examiner* — Donald J Wallace
(74) *Attorney, Agent, or Firm* — Birch, Stewart, Kolasch & Birch, LLP

(57) ABSTRACT

A navigation device is provided including a data storage unit for storing data, and a service information reception processing unit for receiving service information distributed from an external registration destination facility with which member registration is made, and a service information analyzing processing unit performs a predetermined process on the service information received by the service information reception processing unit to register the service information in the data storage unit. The navigation device further includes a notification condition customization setting unit for setting a notification condition, and a facility icon display processing unit displays whether or not there is an update in service information of a registration destination facility on a map according to the notification condition set by the notification condition customization setting unit.

8 Claims, 16 Drawing Sheets

(56) References Cited

U.S. PATENT DOCUMENTS

| | | | |
|---|---|---|---|
| 8,478,337 B2 * | 7/2013 | Kawagishi | 455/556.1 |
| 8,478,517 B2 * | 7/2013 | Lim et al. | 701/453 |
| 8,571,792 B2 * | 10/2013 | Goto et al. | 701/451 |
| 2002/0003495 A1 * | 1/2002 | Johnstone et al. | 701/208 |
| 2002/0013815 A1 * | 1/2002 | Obradovich et al. | 709/204 |
| 2002/0077745 A1 * | 6/2002 | Ohmura et al. | 701/208 |
| 2002/0082773 A1 * | 6/2002 | Ikeuchi et al. | 701/211 |
| 2002/0111855 A1 * | 8/2002 | Hammerstad | 705/14 |
| 2002/0194061 A1 * | 12/2002 | Himmel et al. | 705/14 |
| 2007/0106468 A1 * | 5/2007 | Eichenbaum et al. | 701/211 |
| 2008/0139245 A1 * | 6/2008 | Huh et al. | 455/556.2 |
| 2011/0040626 A1 * | 2/2011 | Lin | 705/14.63 |
| 2012/0030002 A1 * | 2/2012 | Bous et al. | 705/14.36 |

FOREIGN PATENT DOCUMENTS

| | | |
|---|---|---|
| EP | 1813914 A2 | 8/2007 |
| JP | 9-229694 A | 9/1997 |
| JP | 10-063728 A | 3/1998 |
| JP | 2002-314644 A | 10/2002 |
| JP | 2004-264119 A | 9/2004 |
| JP | 2005-011368 A | 1/2005 |
| JP | 2007-128344 A | 5/2007 |
| JP | 2007-218855 A | 8/2007 |
| JP | 2008-175655 A | 7/2008 |
| JP | 2008-234614 A | 10/2008 |
| WO | WO 2008/139890 A1 * | 11/2008 |

* cited by examiner

FIG.4

| Keyword Code | Keyword Name |
|---|---|
| 1 | Facility Genre |
| 2 | Facility Name |
| 3 | Regional Area |
| 4 | Specific Product |
| 5 | Holding Date |
| 6 | Campaign Information |
| 7 | Reservation Information |
| 8 | Reservation Date |
| 9 | Charge |
| 10 | Note |
| 11 | .. |
| 12 | . |
| 13 | . |

FIG.5

| Facility Number | Keyword 1 | Keyword 2 | Keyword 3 | Keyword 4 | Keyword 5 | Keyword 6 |
|---|---|---|---|---|---|---|
| 1 | 1 | 2 | 4 | 5 | 6 | - |
| 2 | 1 | 2 | 7 | 8 | 9 | 10 |
| 3 | ... | | | | | |

FIG.8

| Registration Number | Expiration Date | Position Coordinate | Notification Target | Keyword 1 | Keyword 2 | Keyword 3 | Keyword 4 | Keyword 5 | Keyword 6 |
|---|---|---|---|---|---|---|---|---|---|
| 100001 | 1 | Latitude(35.65), Longitude(139.74) | TRUE | General Goods | Jack-of-All-Trades Market | Leisure Goods | 9/1/2009 | 30% Discount on Specific Products | — |
| 100002 | 8 | Latitude(35.65), Longitude(139.74) | FALSE | General Goods | Jack-of-All-Trades Market | Household Goods | 16/1/2009 | 20% Discount on Specific Products | — |
| 100003 | 15 | Latitude(35.65), Longitude(139.74) | FALSE | General Goods | Jack-of-All-Trades Market | Accessories | 23/1/2009 | 50% Discount on Specific Products | — |
| 200001 | 2 | Latitude(36.14), Longitude(136.55) | TRUE | Eating and Drinking | □□ Dish | ×× Course | 10/1/2009 | 3,000 Yen | Come to Restaurant around 7:00 P.M |
| 200002 | 34 | Latitude(36.14), Longitude(136.55) | FALSE | Eating and Drinking | □□ Dish | △△ Course | 11/2/2009 | 10,000 Yen | Come to Restaurant around 7:00 P.M |
| 300001 | ... | | | | | | | | |

FIG.10

| Facility Number | Notification Period | Automatic Registration | Targeted Search | Target for Reception | Notification Target Facility |
|---|---|---|---|---|---|
| 1 | Expired Two Days Ago | OFF | ON | ON (Default) | ON (Default) |
| 2 | Expired Three Days Ago | ON | OFF | ON (Default) | ON (Default) |
| 3 | ... | | | | |

FIG.11

| Item | Setting Information |
|---|---|
| Updated Date | 26/1/2009 |
| Periodical Update | Every Day |

NAVIGATION DEVICE

FIELD OF THE INVENTION

The present invention relates to a navigation device which guides a user to his or her destination. More particularly, it relates to a technology of displaying service information.

BACKGROUND OF THE INVENTION

In recent years, as an online connection of a navigation device becomes possible, the user of the navigation device is enabled to browse various pieces of information via the Internet. Under such conditions, the user becomes able to also receive service information distributed from a facility with which the user has registered (referred to a "registration destination facility" from here on) via the navigation device, and therefore the user can browse the service information at any time.

As such a technology of enabling the user to browse service information, a scheduler or the like for allowing the user register information which the user requires among the service information distributed from the registration destination facility in the navigation device, and for notifying the service information to the user at a specified date is typically used. Among those methods, there has been proposed a method of not only notifying service information but also making a search for a route to a registration destination facility, providing route guidance in consideration of a scheduled time, and so on in cooperation with the functions of the navigation device.

For example, patent reference 1 discloses an operation schedule cooperation device using a mobile information terminal which facilitates a modification of an operation schedule and an action which is caused by modified results. This operation schedule cooperation device acquires traffic information from the mobile information terminal which the user carries by using a communication function disposed in the mobile information terminal. The mobile information terminal has data about the operation schedule of the user, predicts a scheduled time of the operation schedule including a traveling time before the user takes an action, and further modifies the scheduled time in real time by using traffic information acquired by the communication unit. The mobile information terminal then presents the occurrence of a modification of the scheduled time, and the results of the modification for the user and delivers the modification of the scheduled time to the destination, thereby not only making effective use of the user's time but also assisting the cooperation of the user's action with the destination.

RELATED ART DOCUMENT

Patent Reference

Patent reference 1: Japanese Unexamined Patent Application Publication No. Hei 10-63728

A problem with the conventional technology is, however, that the user needs to manually register information which the user requires among the service information distributed from the registration destination facility in the navigation device, and, when there are many pieces of information to be registered, a longtime is required for the user to perform the registering operation. Another problem is that when a holding date and time or the like which is shown by the service information distributed from the registration destination facility has passed, the user will check the unnecessary service information, and has to spend useless time which is proportional to the number of registered pieces of information.

The present invention is made in order to solve the above-mentioned problems, and it is therefore an object of the present invention to provide a navigation device which can easily register service information which is distributed from a registration destination facility and which can easily refer to the service information.

SUMMARY OF THE INVENTION

In accordance with the present invention, there is provided a navigation device including: a data storage unit for storing data; a service information reception processing unit for receiving service information distributed from an external registration destination facility with which member registration is made; a service information analyzing processing unit for performing a predetermined process on the service information received by the service information reception processing unit to register the service information in the data storage unit; a notification condition customization setting unit for setting a notification condition; and a facility icon display processing unit for displaying whether or not there is an update in service information of a registration destination facility on a map according to the notification condition set by the notification condition customization setting unit.

Because the navigation device in accordance with the present invention performs the predetermined process on the service information distributed from the external registration destination facility to register the service information in the data storage unit, and displays whether or not there is an update in service information of a registration destination facility on the map according to the set notification condition, the navigation device can easily register and refer to the service information which is distributed from the registration destination facility.

BRIEF DESCRIPTION OF THE FIGURES

FIG. 4 is a view showing an example of a keyword code format list for use in the navigation device in accordance with Embodiment 1 of the present invention;

FIG. 5 is a view showing an example of provided information format records for registration which are created by the navigation device in accordance with Embodiment 1 of the present invention;

FIG. 8 is a view showing an example of service information records registered in the service information analysis processing which is carried out by the navigation device in accordance with Embodiment 1 of the present invention;

FIG. 10 is a view showing an example of a facility notification associated setting table which is updated through the notification condition setting screen transition processing which is carried out by the navigation device in accordance with Embodiment 1 of the present invention;

FIG. 11 is a view showing an example of a service information setting table which is updated through the notification condition setting screen transition processing which is carried out by the navigation device in accordance with Embodiment 1 of the present invention;

EMBODIMENTS OF THE INVENTION

Hereafter, in order to explain this invention in greater detail, the preferred embodiments of the present invention will be described with reference to the accompanying drawings. Embodiment 1.

Figure 1:
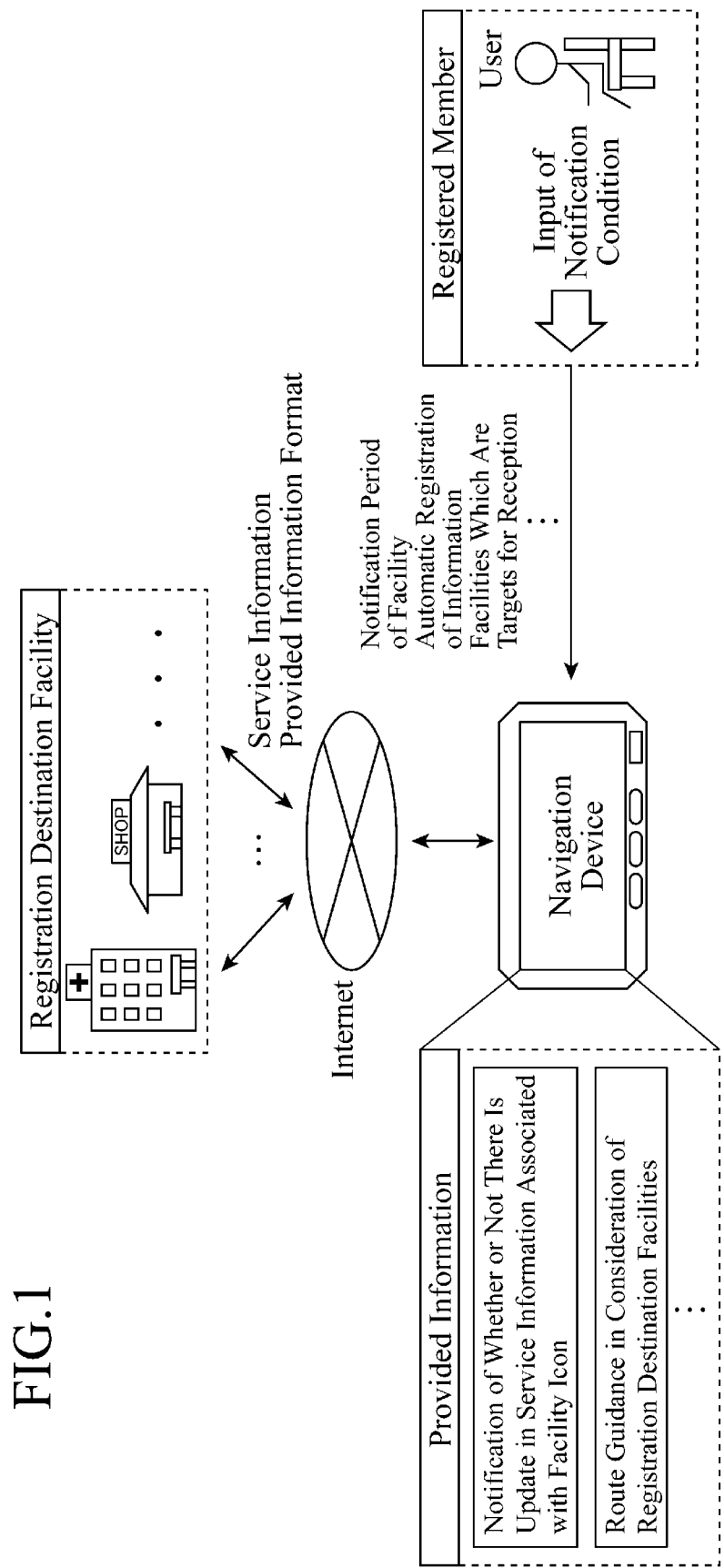
FIG. 1 is a view showing the structure of a service information distribution system to which a navigation device in accordance with Embodiment 1 of the present invention is applied.

FIG. 1 is a view showing the structure of a service information distribution system to which a navigation device in accordance with Embodiment 1 of the present invention is applied. In this service information distribution system, the navigation device is connected to registration destination facilities via the Internet.

In this service information distribution system, a user who is a registered member of a registration destination facility sets a notification condition to the navigation device. Service information distributed from the registration destination facility is presented for the user at an appropriate timing according to the notification condition set by the user and according to a current position.

For example, in this service information distribution system, service information and a provided information format which are transmitted via the Internet from a registration destination facility are registered in the navigation device. In the navigation device, a process for implementing a function, such as "notification of whether or not there is an update in service information associated with a facility icon" or "route guidance in consideration of registration destination facilities", is carried out according to the set notification condition.

Figure 2:
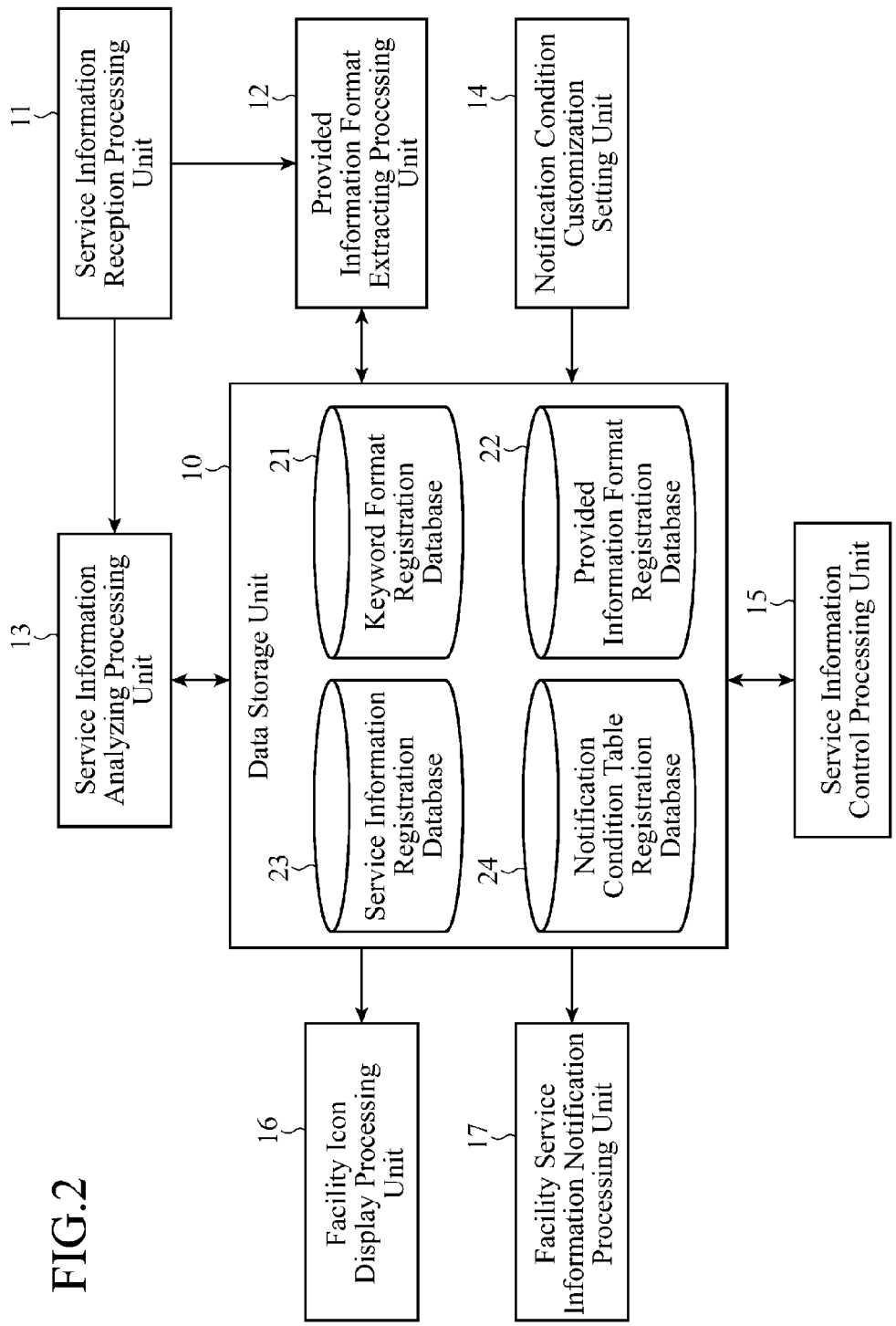
FIG. 2 is a block diagram showing the structure of the navigation device in accordance with Embodiment 1 of the present invention.

FIG. 2 is a block diagram showing the structure of the navigation device. This navigation device is provided with a data storage unit 10, a service information reception processing unit 11, a provided information format extracting processing unit 12, a service information analyzing processing unit 13, a notification condition customization setting unit 14, a service information control processing unit 15, a facility icon display processing unit 16, and a facility service information notification processing unit 17.

The service information reception processing unit 11, the provided information format extracting processing unit 12, the service information analyzing processing unit 13, and the notification condition customization setting unit 14 mainly process input information, the service information control processing unit 15 manages stored data, and the facility icon display processing unit 16 and the facility service information notification processing unit 17 create information to be presented for the user.

Hereafter, each of the components will be explained in detail. The data storage unit 10 is provided with a keyword format registration database 21, a provided information format registration database 22, a service information registration database 23, and a notification condition table registration database 24. The keyword format registration database 21 stores a keyword code format list. The provided information format registration database 22 stores provided information format records. The service information registration database 23 stores service information records. The notification condition table registration database 24 stores a notification condition table.

The service information reception processing unit 11 determines information received, via the Internet, from a registration destination facility, and, when the information is a provided information format, sends this information to the provided information format extracting processing unit 12, whereas when the received information is service information, the service information reception processing unit sends this information to the service information analyzing processing unit 13. When receiving the provided information format from the service information reception processing unit 11, the provided information format extracting processing unit 12 creates a provided information format record for registration and sends this record to the data storage unit 10. As a result, the provided information format record is registered in the provided information format registration database 22.

When receiving the service information from the service information reception processing unit 11, the service information analyzing processing unit 13 adds an expiration date and a position coordinate of the facility to the received service information by using the provided information format record of the registration destination facility to create a service information record for registration, and sends this service information record to the data storage unit 10. As a result, the service information record is registered in the service information registration database 23.

The notification condition customization setting unit 14 determines a notification condition setting type and creates a notification condition registration table, and sends this table to the data storage unit 10. As a result, the notification condition registration table is registered in the service information registration database 23. In this case, the notification condition customization setting unit 14 can be constructed in such a way as to set a notification condition for each registration destination facility. According to this structure, the user is enabled to make his or her favorite detailed settings for each facility.

The service information control processing unit 15 manages each service information record registered in the data storage unit 10. For example, the service information control processing unit 15 automatically deletes a service information record in which a holding date and time or the like has passed, and performs an update or the like on service information having a preset update period.

The facility icon display processing unit 16 determines whether or not there is an update in service information provided by a registration destination facility on the on-screen map which corresponds to each updated service information record to blink the icon of any registration destination facility with an update. When a registration destination facility blinking is selected, the facility service information notification processing unit 17 extracts the corresponding service information record from the data storage unit 10, and presents the service information to be displayed for the user. When there exists a registration destination facility with an update in an area surrounding the route, the facility service information notification processing unit 17 makes a re-search for a route in consideration of the registration destination facility which the user has selected.

Next, the operation of the navigation device in accordance with Embodiment 1 of the present invention which is constructed as above will be explained.

Figure 3:
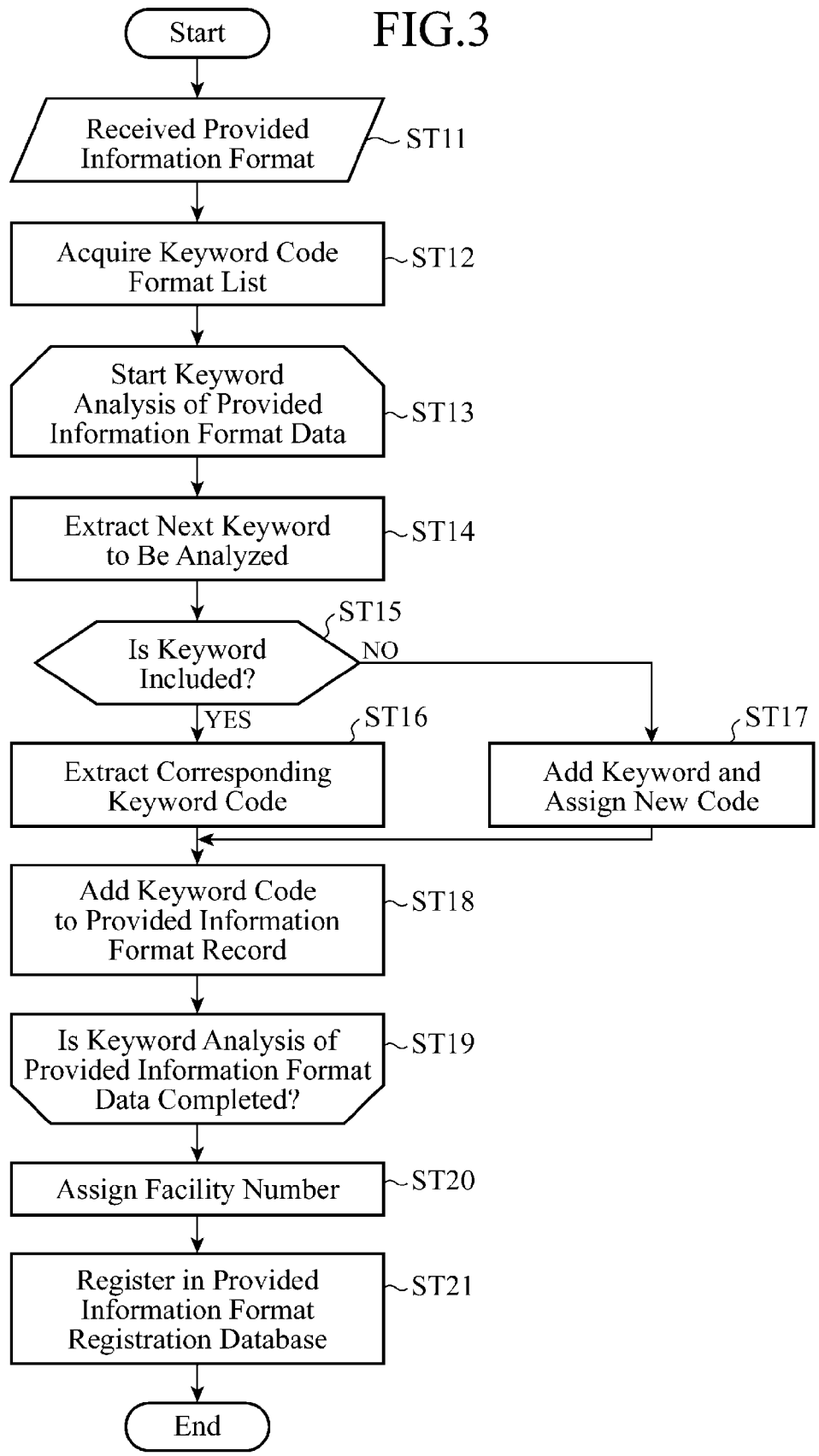
FIG. 3 is a flow chart showing provided information format extracting processing which is carried out by the navigation device in accordance with Embodiment 1 of the present invention.

(1) First, provided information format extracting processing for extracting a provided information format distributed from a registration destination facility, and registering the provided information format in the data storage unit 10 will be explained with reference to a flow chart shown in FIG. 3. This provided information format extracting processing is carried out by the provided information format extracting processing unit 12.

In the provided information format extracting processing, a received provided information format is inputted first (step ST11). More specifically, the service information reception processing unit 11 determines information received, via the Internet, from a registration destination facility, and when the information is a provided information format, sends this information to the provided information format extracting processing unit 12.

The keyword code format list is then acquired (step ST12). More specifically, the provided information format extracting processing unit 12 acquires the keyword code format list registered in advance in the keyword format registration database 21 of the data storage unit 10. The keyword code format list consists of a table in which a correspondence between keyword codes and keyword names is stored, as shown in FIG. 4. In an example shown in FIG. 4, a keyword name corresponding to a keyword code of "1" is "facility genre". Hereafter, similarly, a keyword name corresponding to a keyword code of "2" is "facility name", a keyword name corresponding to a keyword code of "3" is "regional area", a keyword name corresponding to a keyword code of "4" is "specific product", a keyword name corresponding to a keyword code of "5" is "holding date", a keyword name corresponding to a keyword code of "6" is "campaign information", a keyword name corresponding to a keyword code of "7" is "reservation information", a keyword name corresponding to a keyword code of "8" is "reservation date", a keyword name corresponding to a keyword code of "9" is "charge", a keyword name corresponding to a keyword code of "10" is "note", and . . . .

Keyword analysis of the provided information format data is then started (step ST13). In this keyword analysis, a keyword to be analyzed the next time is extracted first (step ST14). More specifically, the provided information format extracting processing unit 12 extracts the next keyword which is to be analyzed from the provided information format inputted in step ST11.

Whether or not the keyword is included is then checked to see (step ST15). More specifically, the provided information format extracting processing unit 12 checks to see whether the keyword extracted in step ST14 is included in the keyword code format list acquired in step ST12. When it is determined in this step ST15 that the keyword is included, the corresponding keyword code is extracted (step ST16). More specifically, the provided information format extracting processing unit 12 extracts the keyword code corresponding to the keyword from the keyword code format list. After that, the navigation device advances the sequence to step ST18.

In contrast, when it is determined in step ST15 that the keyword is not included, the keyword is added and a new code is assigned to this keyword (step ST17). More specifically, the provided information format extracting processing unit 12 adds the keyword extracted in step ST14 to the keyword code format list, and assigns a new code to the keyword. After that, the navigation device advances the sequence to step ST18.

In step ST18, the keyword code is added to the provided information format record. Whether or not the keyword analysis of the provided information format data is completed is then checked to see (step ST19). When it is determined in this step ST19 that the keyword analysis is not completed, the processes in above-mentioned steps ST14 to ST18 are repeatedly carried out.

In contrast, when it is determined in step ST19 that the keyword analysis of the provided information format data is completed, assignment of a facility number is then carried out (step ST20). More specifically, the provided information format extracting processing unit 12 assigns a facility number to the provided information format record to which the keyword code is added in step ST18, and creates a provided information format record for registration. FIG. 5 is a view showing an example of provided information format records for registration.

The provided information format record for registration is then registered in the provided information format registration database (step ST21). More specifically, the provided information format extracting processing unit 12 registers the provided information format record to which the facility number is added in step ST20 in the provided information format registration database 22 of the data storage unit 10. After the above-mentioned processes are done, the provided information format extracting processing is ended.

Figure 6:
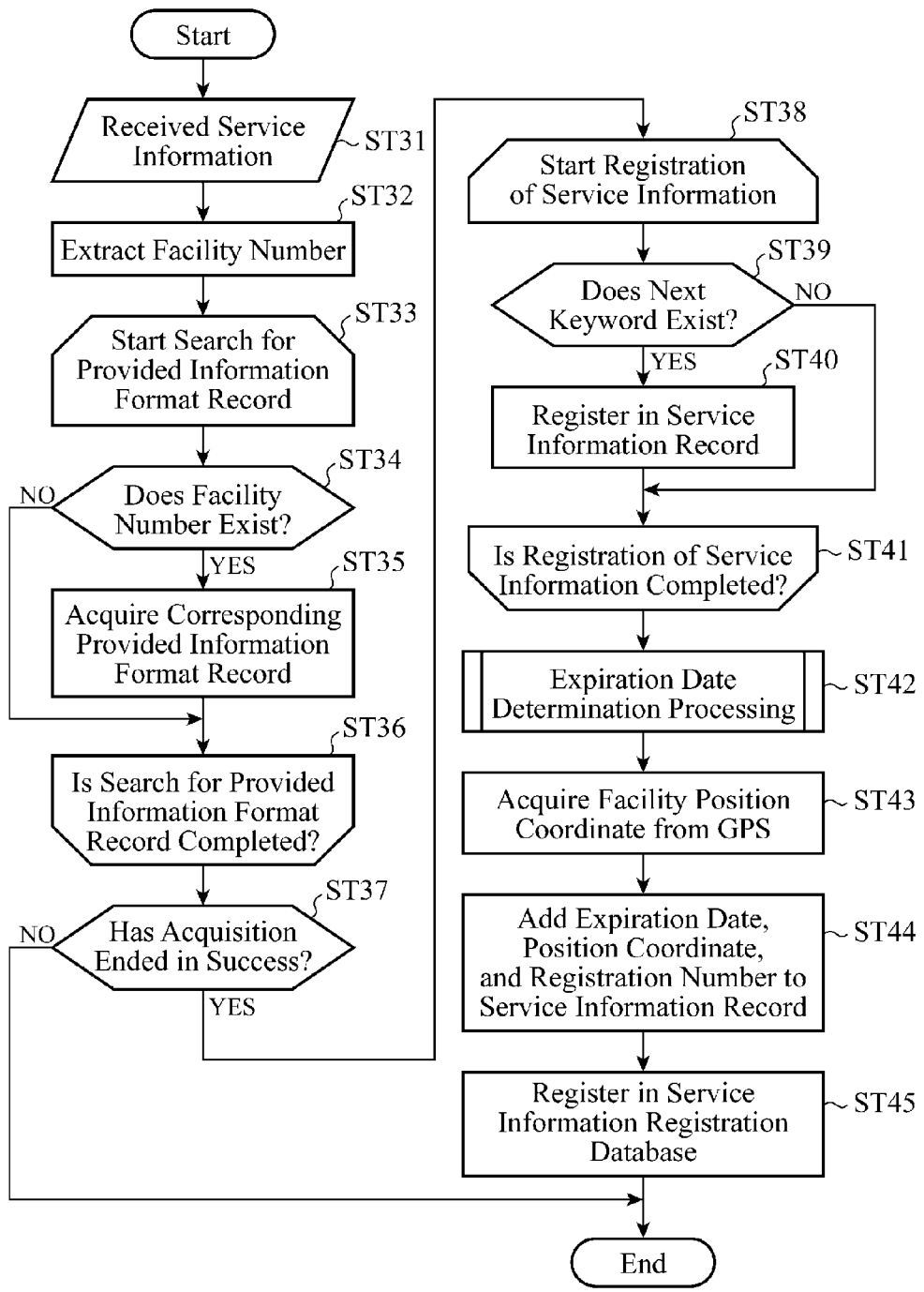
FIG. 6 is a flow chart showing service information analysis processing which is carried out by the navigation device in accordance with Embodiment 1 of the present invention.

(2) Next, service information analysis processing for analyzing service information for registration in the data storage unit 10 will be explained with reference to a flowchart shown in FIG. 6. This service information analysis processing is carried out by the service information analyzing processing unit 13.

In the service information analysis processing, received service information is inputted first (step ST31). More specifically, the service information reception processing unit 11 determines information received, via the Internet, from a registration destination facility, and when the information is service information, sends this information to the service information analyzing processing unit 13. A facility number is then extracted (step ST32). More specifically, the service information analyzing processing unit 13 extracts a facility number from the service information received from the service information reception processing unit 11 in step ST31.

A search for a provided information format record is then started (step ST33). In this search, whether the facility number exists is checked to see first (step ST34). More specifically, the service information analyzing processing unit 13 checks to see whether the facility number extracted in step ST32 exists in the provided information format registration database 22 of the data storage unit 10.

When it is determined in this step ST34 that the facility number exists in the provided information format registration database, the corresponding provided information format record is acquired (step ST35). More specifically, the service information analyzing processing unit 13 acquires the provided information format record having the facility number from the provided information format registration database 22. In contrast, when it is determined in step ST34 that the facility number does not exist in the provided information format registration database, the process of step ST35 is skipped. Whether the search for the provided information format record is completed is then checked to see (step ST36). When it is determined in this step ST36 that the search for the provided information format record is not completed, the processes in above-mentioned steps ST34 to ST35 are repeatedly carried out.

In contrast, when it is determined in step ST36 that the search for the provided information format record is completed, whether the acquisition has ended in success is then checked to see (step ST37). More specifically, the service information analyzing processing unit 13 checks to see whether the service information analyzing processing unit has acquired the provided information format record. When it is determined in this step ST37 that the acquisition has not ended in success, the service information analysis processing is ended.

In contrast, when it is determined in step ST37 that the acquisition has ended in success, registration of the service information is started (step ST38). In this registration of the service information, whether the next keyword exists is checked to see first (step ST39). More specifically, the service information analyzing processing unit 13 checks to see whether the next keyword of the service information inputted in step ST31 exists.

When it is determined in this step ST39 that the next keyword exists, registration in a service information record is then carried out (step ST40). More specifically, the service information analyzing processing unit 13 extracts the contents of the corresponding keyword from the service information inputted in step ST31, and stores the contents in a corresponding part of the service information record. In contrast, when it is determined in step ST39 that the next keyword does not exist, the process of step ST40 is skipped. Whether the registration of the service information is completed is then checked to see (step ST41). When it is determined in this step ST41 that the registration of the service information is not completed, the processes in above-mentioned steps ST39 to ST40 are repeatedly carried out.

Figure 7:
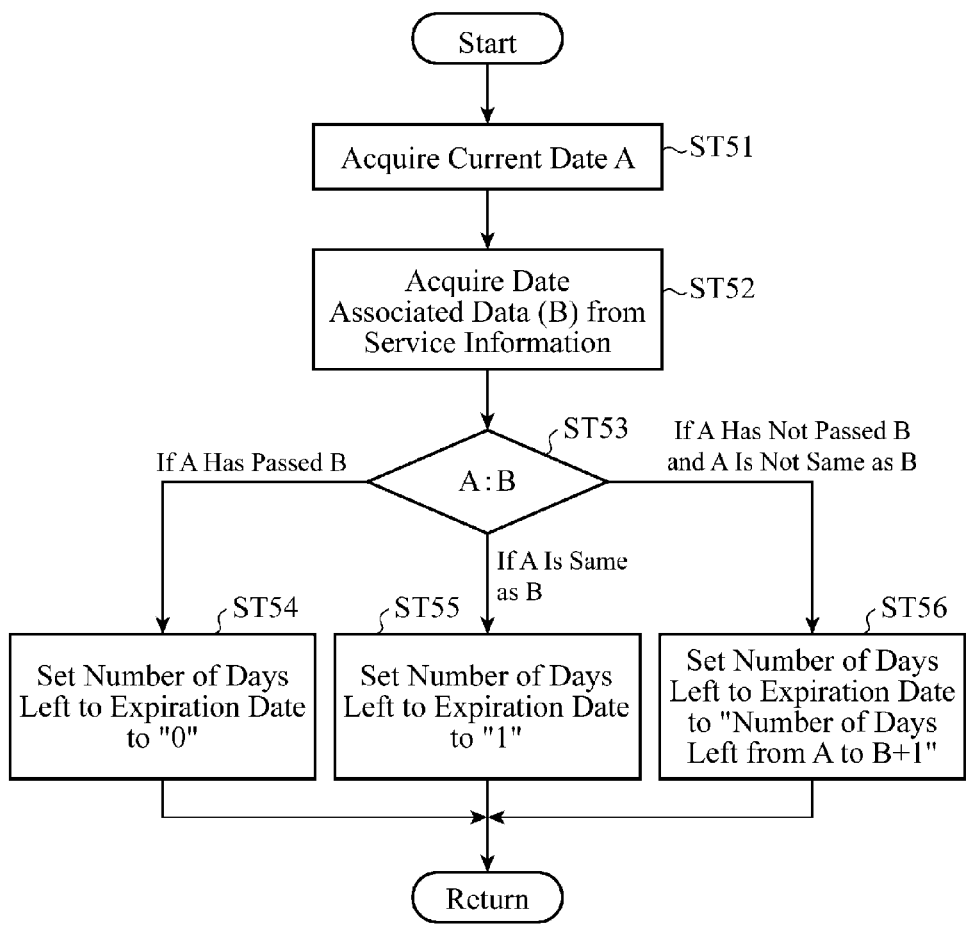
FIG. 7 is a flow chart showing an expiration date determination process in the service information analysis processing which is carried out by the navigation device in accordance with Embodiment 1 of the present invention in detail.

In contrast, when it is determined in step ST41 that the registration of the service information is completed, expiration date determination processing is then carried out (step ST42). More specifically, the service information analyzing processing unit 13 calculates the expiration date of the service information. FIG. 7 is a flow chart showing the details of the expiration date determination processing. In this expiration date determination processing, the current date (referred to as "A" from here on) is acquired first (step ST51). More specifically, the service information analyzing processing unit 13 acquires the current date from a not-shown time register.

Date associated data (referred to as "(B)" from here on) is then acquired from the service information (step ST52). More specifically, the service information analyzing processing unit 13 acquires the date associated data (B) from the service information. A comparison between the dates is then made (step ST53). More specifically, the service information analyzing processing unit 13 compares the current date A acquired in step ST51 with the date (referred to as "B" from here on) shown by the date associated data acquired in step ST52. When it is determined, as a result of the comparison in this step ST53, that the current date A has passed the date B, the number of days left to the expiration date is set to "0" (step ST54). More specifically, the service information analyzing processing unit 13 sets the number of days left to the expiration date to "0". Then, the navigation device returns from the expiration date determination processing.

When it is determined, as a result of the comparison in above-mentioned step ST53, that the current date A is the same as the date B, the number of days left to the expiration date is set to "1" (step ST55). More specifically, the service information analyzing processing unit 13 sets the number of days left to the expiration date to "1". Then, the navigation device returns from the expiration date determination processing.

When it is determined, as a result of the comparison in above-mentioned step ST53, that the current date A ha not passed the date B, and is not the same as the date B, the number of days left to the expiration date is set to "the number of days left from the current date A to the date B+1" (step ST56). More specifically, the service information analyzing processing unit 13 sets the number of days left to the expiration date to "the number of days remaining from the current date A to the date B+1". Then, the navigation device returns from the expiration date determination processing.

In the service information analysis processing after returning from the expiration date determination processing, the position coordinate of the facility is then acquired from GPS (Global Positioning System) (step ST43). More specifically, the service information analyzing processing unit 13 acquires the position coordinate of the facility from GPS signals received by a not-shown GPS receiver.

The expiration date, the position coordinate, and the registration number are then added to the service information record (step ST44). More specifically, the service information analyzing processing unit 13 adds the expiration date calculated in step ST42, and the position coordinate and the registration number acquired in step ST43 to the service information record registered in the processes of steps ST38 to ST41.

Registration in the service information registration database is then carried out (step ST45). More specifically, the service information analyzing processing unit 13 registers the service information record to which the expiration date, position information, and the registration number are added in step ST44 in the service information registration database 23. FIG. 8 is a view showing an example of service information records which are registered in this way. After that, the service information analysis processing is ended.

As mentioned above, because the service information analyzing processing unit 13 is constructed in such a way as to process the service information received by the service information reception processing unit 11 by using the provided information format registered by the provided information format extracting processing unit 12 and register the service information in the data storage unit 10 in the service information analysis processing, the service information analyzing processing unit can analyze, classify and register the service information received at the current position, and enables the user to eliminate a complicated registering operation of registering the service information.

Figure 9:
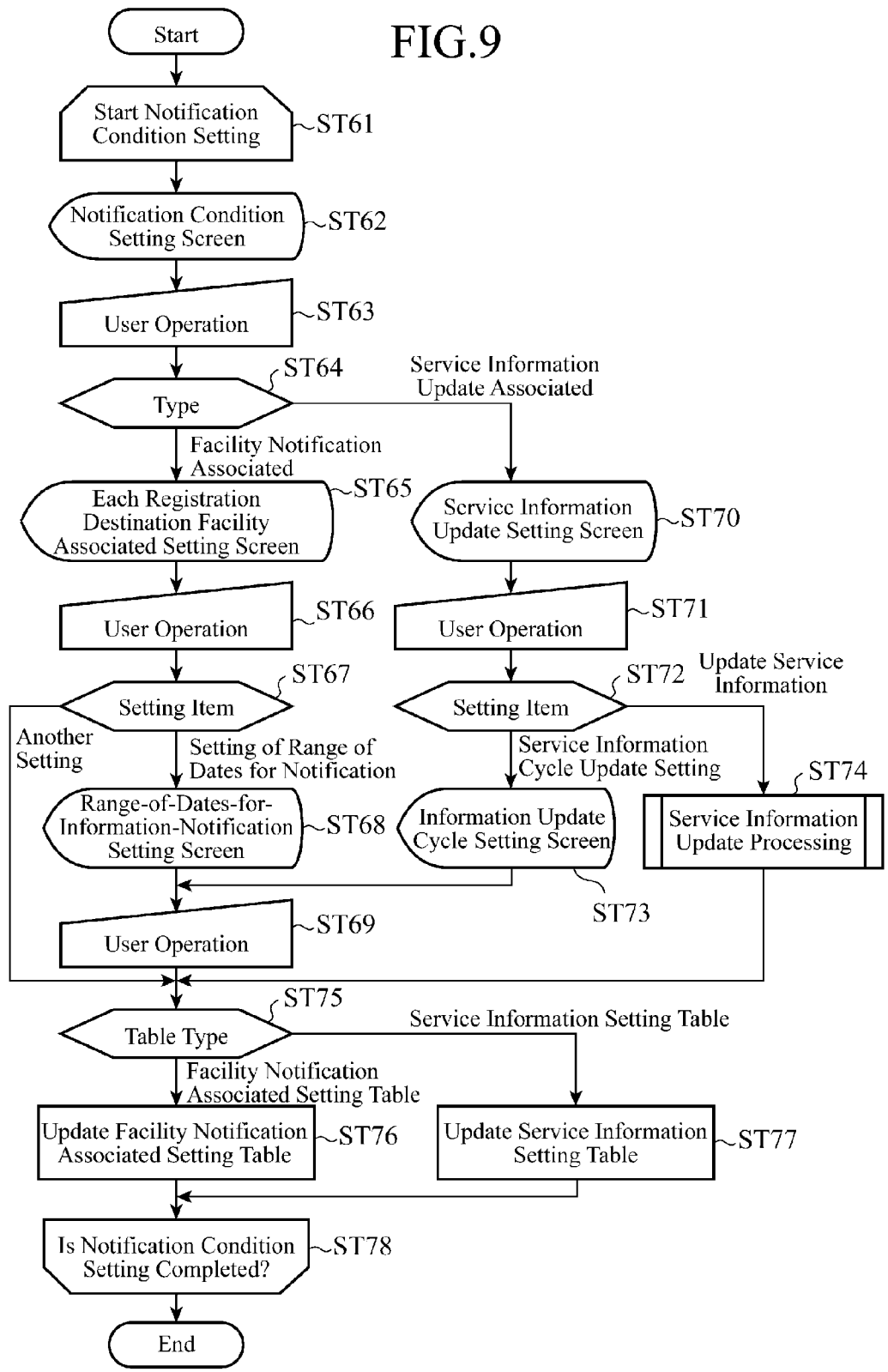
FIG. 9 is a flow chart showing notification condition setting screen transition processing which is carried out by the navigation device in accordance with Embodiment 1 of the present invention.

(3) Next, notification condition setting screen transition processing for setting a notification condition to be registered in the data storage unit 10 will be explained with reference to a flow chart shown in FIG. 9. This notification condition setting screen transition processing is carried out by the notification condition customization setting unit 14.

In this notification condition setting screen transition processing, when a notification condition setting is started (step ST61), a notification condition setting screen is displayed first (step ST62). More specifically, the notification condition customization setting unit 14 outputs a notification condition setting screen to a not-shown display unit. In this state, the user selects one type, i.e. either a facility notification associated type or a service information update associated type by performing an operation (step ST63). When, in this step ST63, one type is selected, the selected type is then checked to see (step ST64). More specifically, the notification condition customization setting unit 14 checks to see whether the type selected instep ST63 is a facility notification associated type or a service information update associated type.

When it is determined in this step ST64 that the selected type is a facility notification associated type, an each registration destination facility associated setting screen is then displayed (step ST65). More specifically, the notification condition customization setting unit 14 outputs the registration destination facility associated setting screen to the display unit. In this state, the user selects a registration destination facility which is the target for setting and changes the setting information about a setting item of this selected registration destination facility by performing an operation (step ST66). The setting item is then checked to see (step ST67). More specifically, the notification condition customization setting unit 14 checks to see whether the setting item of the registration destination facility selected in step ST66 is a setting of a range of dates for notification or another one.

When it is determined in this step ST67 that the selected setting item is a setting of setting a range of dates for notification, a range-of-dates-for-information-notification setting screen is then displayed (step ST68). More specifically, the notification condition customization setting unit 14 outputs the range-of-dates-for-information-notification setting screen to the display unit. In this state, the user sets a range of dates for notification by performing an operation (step ST69). After that, the navigation device advances the sequence to step ST75. Also when it is determined in above-mentioned step ST67 that the selected setting item is another one, the navigation device advances the sequence to step ST75.

When it is determined in above-mentioned step ST64 that the selected type is a service information update associated type, a service information update setting screen is then displayed (step ST70). More specifically, the notification condition customization setting unit 14 displays the service information update setting screen which includes an update cycle field and an update date field for the service information on the display unit. In this state, the user sets the update cycle or the update date of the service information by performing an operation (step ST71). The item set in step ST71 is then checked to see (step ST72). More specifically, the notification condition customization setting unit 14 checks to see whether the item set in step ST71 is a service information cycle update setting or a service information update setting.

When it is determined in this step ST72 that the set item is a service information cycle update setting, an information update cycle setting screen is then displayed (step ST73). More specifically, the notification condition customization setting unit 14 outputs the information update cycle setting screen to the display unit. After that, the navigation device advances the sequence to step ST69. The user, in step ST69, can make his or her favorite update cycle setting for each day by using the information update cycle setting screen.

In contrast, when it is determined in step ST72 that the set item is a service information update setting, service information update processing is then carried out (step ST74). This service information update processing is carried out by the service information control processing unit 15. In this service information update processing, service information is acquired again with the registration destination facility registered in the data storage unit 10 being targeted for the acquisition, the service information registration database 23 including the existing service information is updated. The details of this service information update processing will be explained below in detail with reference to a flowchart of FIG. 12. After that, the navigation device advances the sequence to step ST75.

The type of the table is checked to see in step ST75. More specifically, the notification condition customization setting unit 14 checks to see whether the table to be updated is a facility notification associated setting table or a service information setting table. When it is determined in this step ST75 that the type of the table is a facility notification associated setting table one, the facility notification associated setting table is updated (step ST76). More specifically, the notification condition customization setting unit 14 updates the contents of the facility notification associated setting table according to the change in the setting information which is made through the processes of steps ST65 to ST69, and re-registers the facility notification associated setting table in the notification condition table registration database 24 of the data storage unit 10. FIG. 10 is a view showing an example of the facility information associated setting table which is the target for update. After that, the navigation device advances the sequence to step ST78.

In contrast, when it is determined in step ST75 that the type of the table is a service information setting table one, the service information setting table is updated (step ST77).

More specifically, the notification condition customization setting unit updates the service information setting table according to the setting of the update cycle of the service information which is made through the processes of steps ST70 to ST73, and ST69 or the update of the service information which is made through the processes of steps ST70 to ST72, and ST74, and re-registers the service information setting table in the data storage unit 10. FIG. 11 is a view showing an example of the service information setting table which is the target for update. After that, the navigation device advances the sequence to step ST78. Whether the notification condition setting is completed is checked to see in step ST78, and the above-mentioned processes of steps ST62 to ST77 are repeatedly carried out until the notification condition setting is completed. When it is then determined in step ST78 that the notification condition setting is completed, the notification condition setting screen transition processing is ended.

Figure 12:
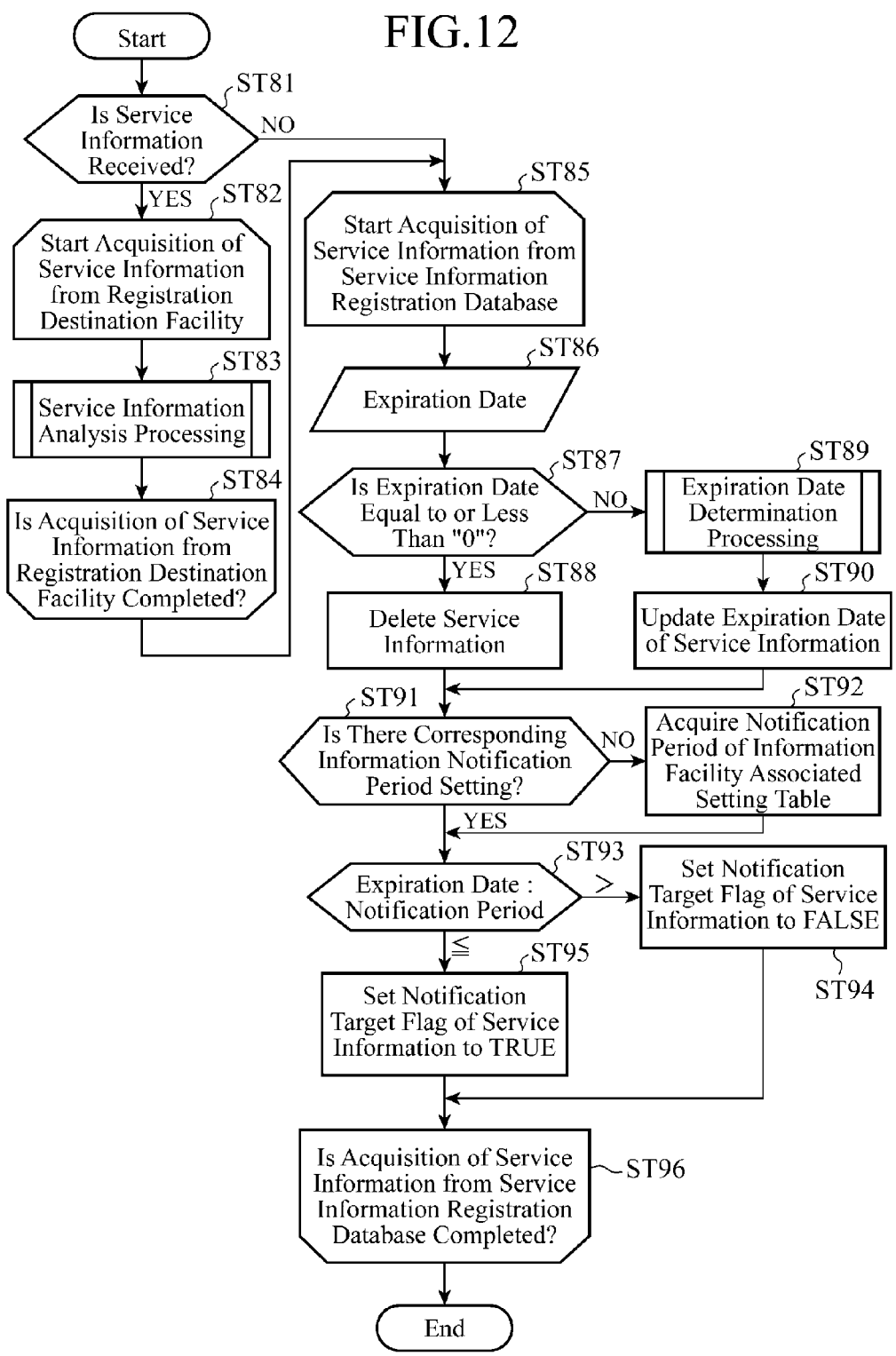
FIG. 12 is a flow chart showing service information update processing carried out by the navigation device in accordance with Embodiment 1 of the present invention.

(4) Next, service information update processing for managing service information registered in the data storage unit 10 will be explained with reference to a flow chart shown in FIG. 12. This service information update processing is carried out by the service information control processing unit 15. More specifically, the service information control processing unit 15 mainly updates a service information record registered in the service information registration database 23 of the data storage unit 10 while when new service information is received, updating all service information records, including the new service information, which are registered in the service information registration database 23.

In the service information update processing, whether or not service information is received is checked to see first (step ST81). When it is determined in this step ST81 that service information is received, acquisition of the service information from the registration destination facility is started (step ST82). In this acquisition of the service information, service information analysis processing is carried out first (step ST83). This service information analysis processing is already explained with reference to the flow chart of FIG. 6. Whether the acquisition of the service information from the registration destination facility is completed is then checked to see (step ST84). When it is determined in this step ST84 that the acquisition of the service information is not completed, the above-mentioned service information analysis processing of step ST83 is carried out repeatedly.

In contrast, when it is determined in step ST84 that the acquisition of the service information from the registration destination facility is completed, and when it is determined in step ST81 that the service information is not received, acquisition of the service information from the service information registration database is started (step ST85). In this acquisition of the service information, the expiration date is acquired first (step ST86). More specifically, the service information control processing unit 15 acquires the expiration date included in the service information record acquired from the service information registration database 23. Whether the expiration date is equal to or less than "0" is then checked to see (step ST87).

When it is determined in this step ST88 that the expiration date is equal to or less than "0", the service information is deleted (step ST88). More specifically, the service information control processing unit 15 deletes the service information record from the service information registration database 23. After that, the navigation device advances the sequence to step ST91. In contrast, when it is determined in step ST87 that the expiration date is neither equal to nor less than "0", expiration date determination processing is then carried out (step ST89). This expiration date determination processing is already explained with reference to the flow chart of FIG. 7. The expiration date of the service information is then updated (step ST90). After that, the navigation device advances the sequence to step ST91.

Whether or not there is a corresponding information notification period setting is checked to see in step ST91. When it is determined in this step ST91 that there is a corresponding information notification period setting, the navigation device advances the sequence to step ST93. In contrast, when it is determined in step ST91 that there is no corresponding information notification period setting, the notification period of the information facility associated setting table is acquired (step ST92). After that, the navigation device advances the sequence to step ST93.

In step ST93, a comparison between the expiration date acquired in step ST86 and the notification period acquired in step ST92 is made. When it is determined from the comparison in this step ST93 that the expiration date has passed the notification period, it is recognized that the service information does not have to be notified, and the notification target flag of the service information is set to FALSE (step ST94). After that, the navigation device advances the sequence to step ST96.

In contrast, when it is determined from the comparison in step ST93 that the expiration date has not passed the notification period, it is recognized that the service information needs to be notified, and the notification target flag of the service information is set to TRUE (step ST95). After that, the navigation device advances the sequence to step ST96. Whether the acquisition of the service information from the service information registration database is completed is checked to see in step ST96. When it is determined in this step ST96 that the acquisition of the service information from the service information registration database 23 is not completed, the processes of steps ST86 to ST95 are repeated. In contrast, when it is determined in step ST96 that the acquisition of the service information from the service information registration database is completed, the service information update processing is ended.

This service information update processing can be configured in such a way that the service information of each registration destination facility displayed on the map is automatically acquired and updated in order of increasing distance from the current position. With this structure, the navigation device makes it possible to always provide the newest service information of each registration destination facility in an area surrounding the current position for the user.

Figure 13:
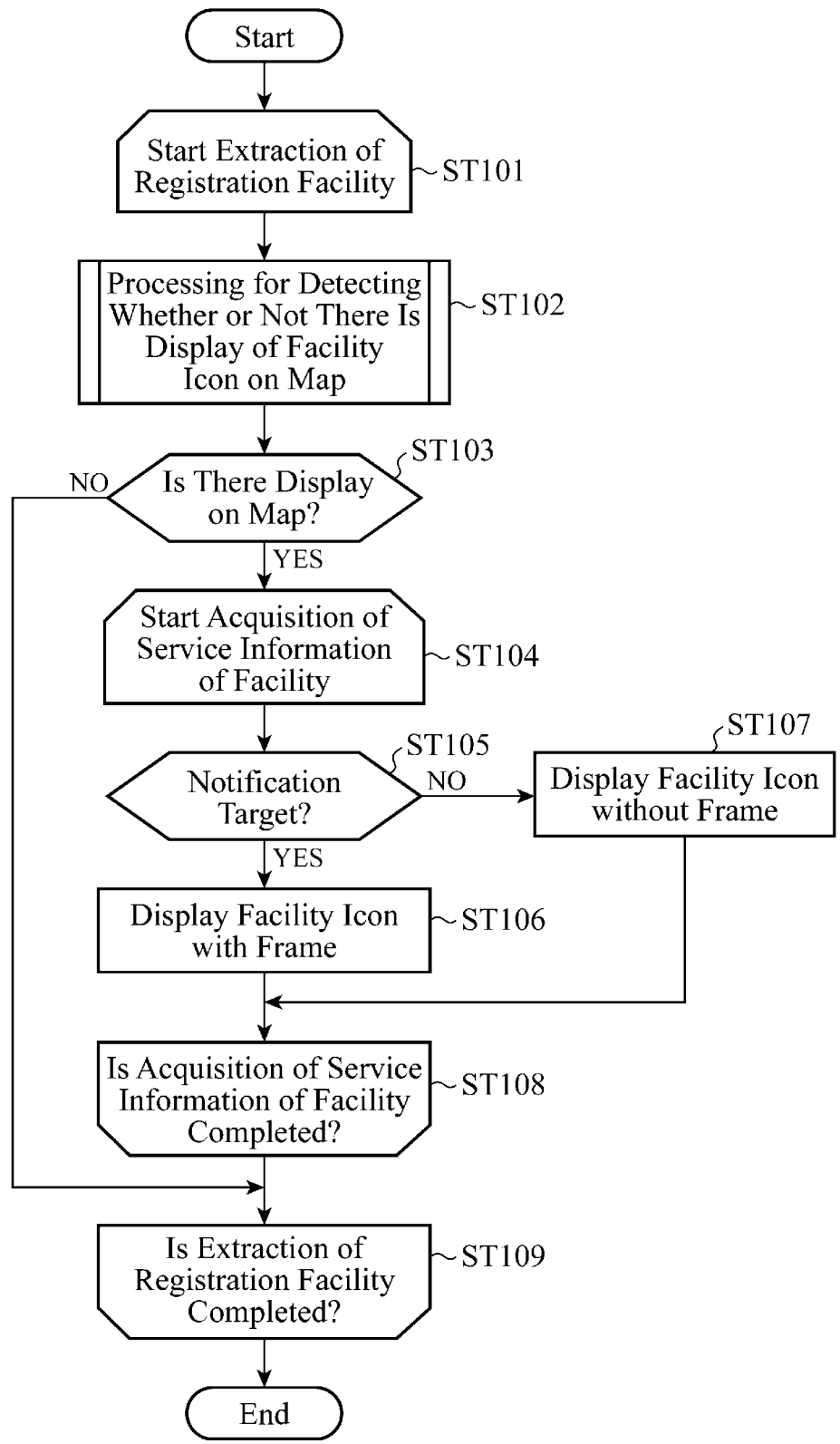
FIG. 13 is a flow chart showing processing for determining whether or not there is an update in service information associated with a facility icon which is carried out by the navigation device in accordance with Embodiment 1 of the present invention.

(5) Next, processing for determining whether or not there is an update in service information associated with a facility icon will be explained with reference to a flow chart shown in FIG. 13. This processing for determining whether or not there is an update in service information is carried out by the facility icon display processing unit 16, and a notification, a display or the like of the service information of each registration destination facility is carried out in the processing.

In this processing for determining whether or not there is an update in service information, when registration facility extraction is started (step ST101), processing for detecting whether or not a facility icon is displayed on the map is carried out first (step ST102). More specifically, the facility icon display processing unit 16 calculates the distance from the current position to each registration destination facility registered in the data storage unit 10, and detects registration destination facilities which can be displayed with the scale of the map currently being displayed. The details of this processing for detecting whether or not a facility icon is displayed on the map will be explained below in detail with reference to a flow chart shown in FIG. 14.

Whether or not there is a display of a facility icon on the map is then checked to see (step ST103). When it is determined in this step ST103 that there is no display of a facility icon on the map, the navigation device advances the sequence to step ST109. In contrast, when it is determined in step ST103 that there is a display of a facility icon on the map, acquisition of the service information of the corresponding facility is started (step ST104). In this acquisition of the service information of the facility, whether or not the facility is a target for notification is checked to see first (step ST105).

More specifically, the facility icon display processing unit 16 checks to see whether the registration destination facility has notification information to be notified.

When it is determined in this step ST105 that the facility is a target for notification, the facility icon is displayed with a frame being added to the icon (step ST106). For example, as shown in an icon of "☐☐ dish" on the icon display screen shown in FIG. 15, a frame is added to the edges of the icon and the icon is further blinked so as to notify an update of the notification information to the user. After that, the navigation device advances the sequence to step ST108.

Figure 15:
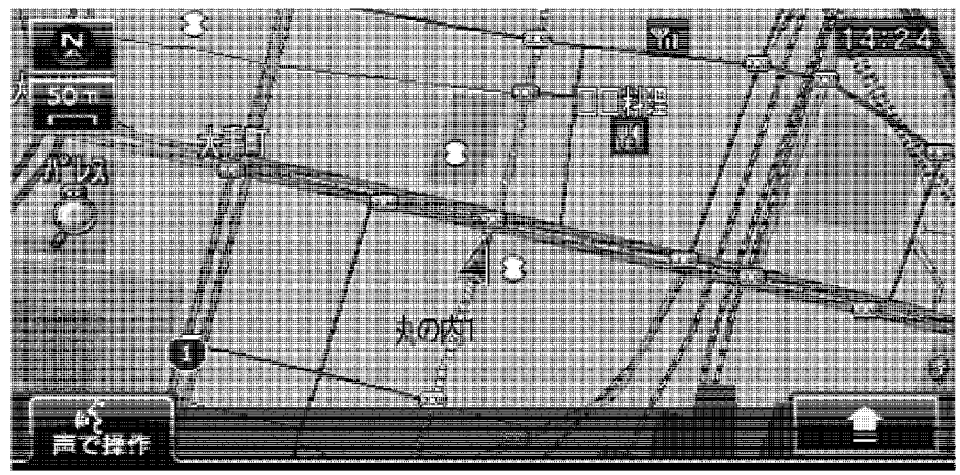
FIG. 15 is a view showing an example of an icon display screen displayed through the processing for determining whether or not there is an update in service information which is carried out by the navigation device in accordance with Embodiment 1 of the present invention.
Figure 16:
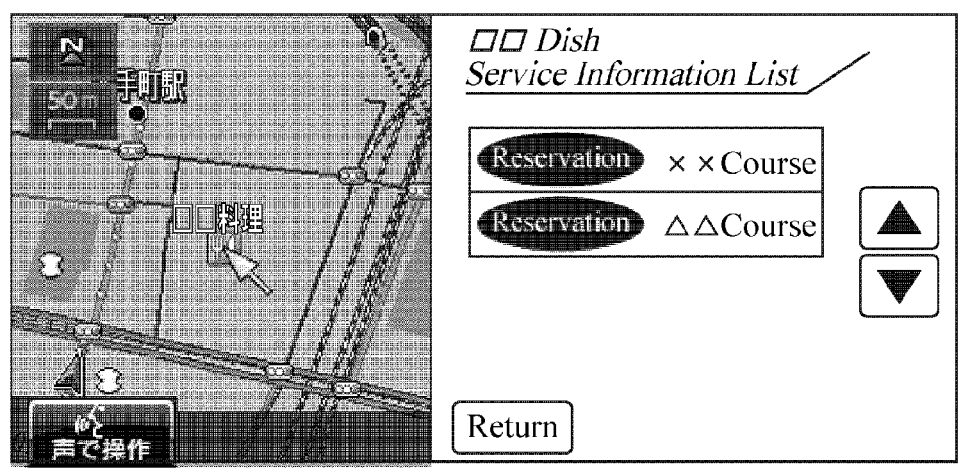
FIG. 16 is a view showing an example of a service information list display screen displayed through the processing for determining whether or not there is an update in service information which is carried out by the navigation device in accordance with Embodiment 1 of the present invention.
Figure 17:
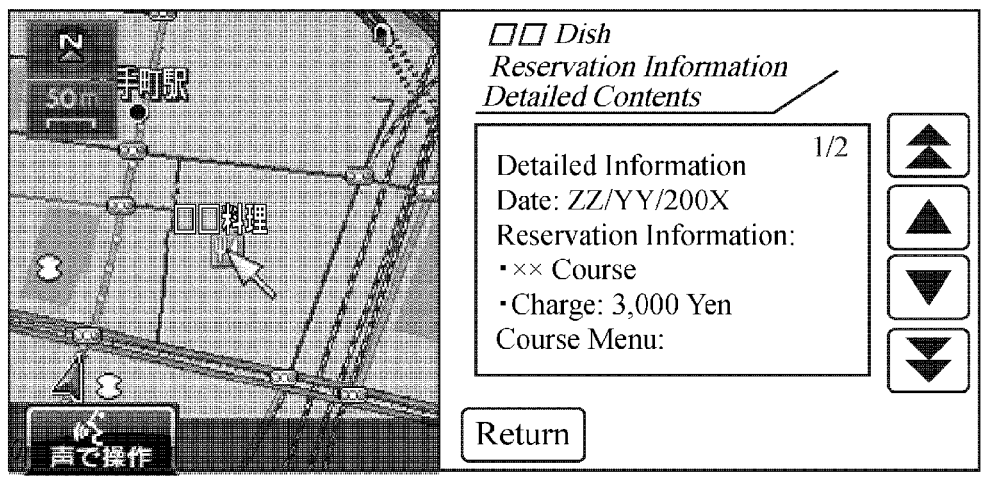
FIG. 17 is a view showing an example of a detailed content display screen displayed through the processing for determining whether or not there is an update in service information which is carried out by the navigation device in accordance with Embodiment 1 of the present invention.

When the user selects (touches) a registration destination facility which is blinking on the icon display screen shown in FIG. 15, a service information list of the registration destination facility is acquired from the data storage unit 10 and is displayed as a service information list display screen, as shown in FIG. 16. When the user further selects (touches) service information which he or she desires to refer to on the service information list display screen shown in FIG. 16, the details of the service information are displayed as a detailed content display screen, as shown in FIG. 17.

In contrast, when it is determined in step ST105 that the facility is not a target for notification, the facility icon is displayed without a frame (step ST107). After that, the navigation device advances the sequence to step ST108. Whether the acquisition of the service information of the facility is completed is checked to see in step ST108. When it is determined in this step ST108 that the acquisition of the service information of the facility is not completed, the above-mentioned processes of steps ST105 to ST107 are carried out repeatedly. In contrast, when it is determined in step ST108 that the acquisition of the service information of the facility is completed, the navigation device advances the sequence to step ST109.

Whether or not the registration facility extraction is completed is checked to see in step ST109. When it is determined in this step ST109 that the registration facility extraction is not completed, the above-mentioned processes of steps ST102 to ST108 are carried out repeatedly. When it is then determined that the registration facility extraction is completed, the processing for determining whether or not there is an update in service information is ended.

Figure 14:
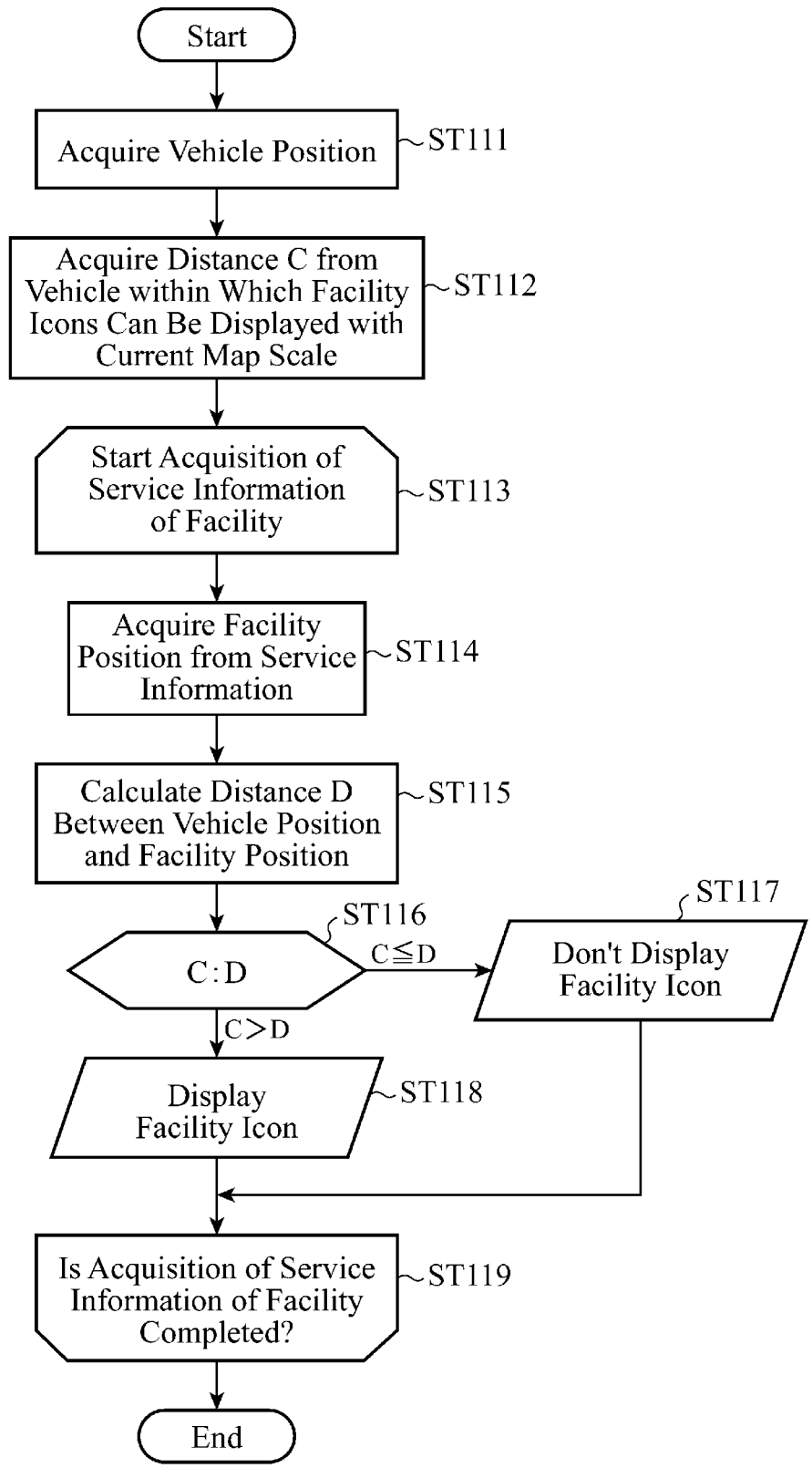
FIG. 14 is a flow chart showing processing for detecting whether or not a facility icon is displayed on a map in the processing for determining whether or not there is an update in service information which is carried out by the navigation device in accordance with Embodiment 1 of the present invention.

Next, the details of the processing for detecting whether or not a facility icon is displayed on the map which is carried out in above-mentioned step ST102 will be explained with reference to a flowchart shown in FIG. 14. In this processing for detecting whether or not a facility icon is displayed on the map, the vehicle position is acquired first (step ST111). More specifically, the facility icon display processing unit 16 acquires the current position of the vehicle from GPS signals received by a not-shown GPS receiver.

The distance from the vehicle within which facility icons can be displayed with the current map scale (referred to as "C" from here on) is then acquired (step ST112). Acquisition of the service information of the facility is then started (step ST113). In this acquisition of the service information of the facility, the facility position is acquired from the service information first (step ST114). The distance between the vehicle position acquired in step ST111 and the facility position acquired in step ST114 (referred to as "D" from here on) is then calculated (step ST115).

A comparison between the distance C from the vehicle within which icons can be displayed, which is acquired in step ST112, and the distance D from the vehicle position to the facility position, which is calculated in step ST115, is then made (step ST116). In this comparison in step ST116, when it is determined that the distance C is longer than the distance D, information showing that the facility icon is displayed is stored (step ST118). After that, the navigation device advances the sequence to step ST119.

In the comparison in step ST116, when the distance C is equal to or shorter than the distance D, information showing that the facility icon is not displayed is stored (step ST117). After that, the navigation device advances the sequence to step ST119. Whether the acquisition of the service information of the facility is completed is checked to see in step ST119. When it is determined in this step ST119 that the acquisition of the service information of the facility is not completed, the above-mentioned processes of steps ST114 to ST118 are carried out repeatedly. In contrast, when it is determined in step ST119 that the acquisition of the service information of the facility is completed, the navigation device returns the sequence to the processing for determining whether or not there is an update in service information (refer to FIG. 13). Thus, because the facility icon display processing unit 16 is constructed in such a way as to calculate the distance from the current position to each registration destination facility in an area surrounding the current position, and not to display the icon of any registration destination facility which cannot be displayed with the scale of the on-screen map, increase of the processing load can be prevented.

Figure 18:
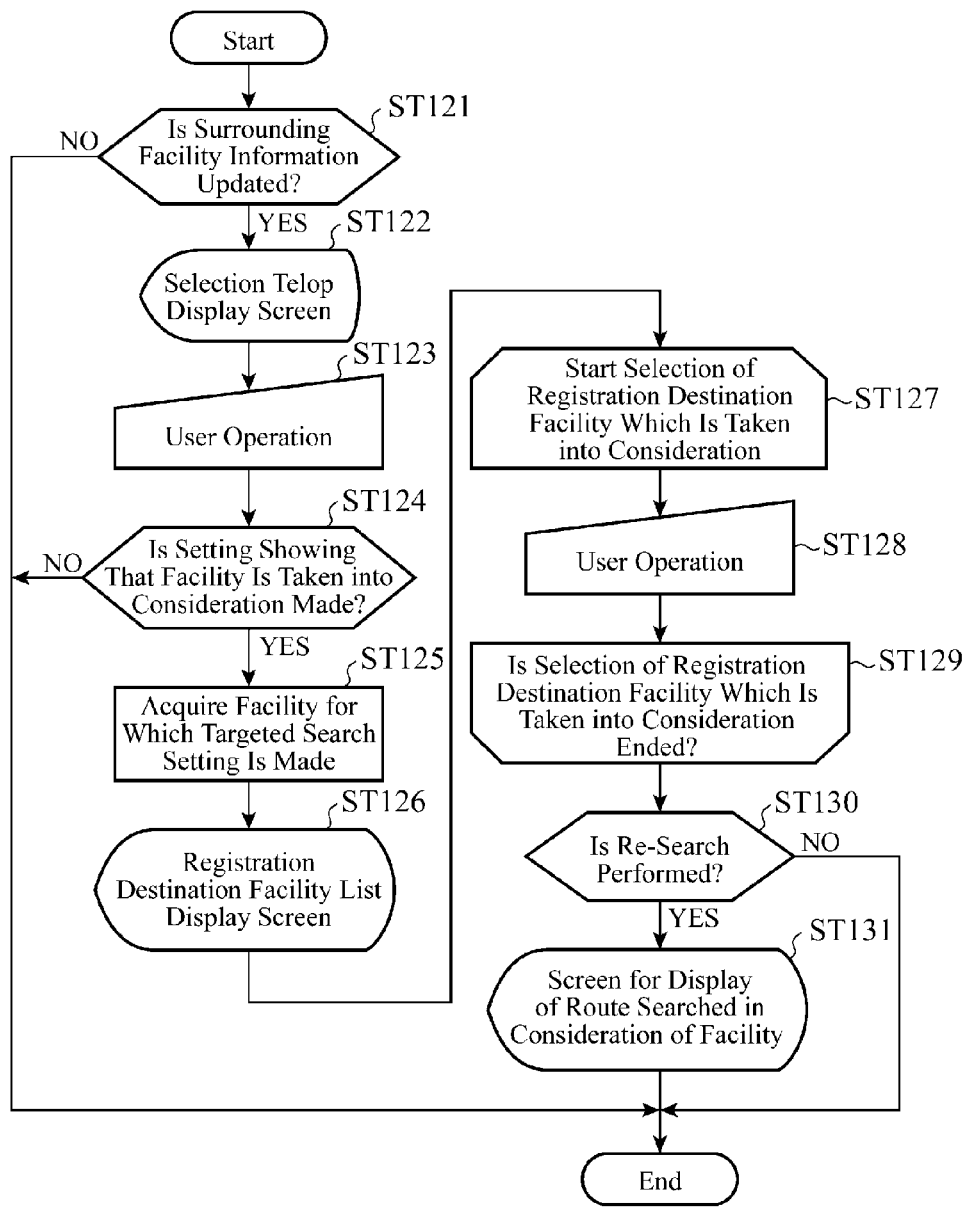
FIG. 18 is a flow chart showing presenting processing for presenting a route which is searched for in consideration of registration destination facilities which is carried out by the navigation device in accordance with Embodiment 1 of the present invention.

(6) Next, "route presenting processing in consideration registration destination facilities" for presenting a route which is searched for in consideration of registration destination facilities each having an update and located within a fixed distance on the searched route will be explained with reference to a flow chart shown in FIG. 18. This route presenting processing in consideration of registration destination facilities is carried out by the facility service information notification processing unit 17.

In the route presenting processing in consideration of registration destination facilities, whether information about a facility in an area surrounding the current position is updated is checked to see first (step ST121). When it is determined in this step ST121 that information about any facility in an area surrounding the current position is not updated, the route presenting processing in consideration of registration destination facilities is ended. In contrast, when it is determined in step ST121 that information about a facility in an area surrounding the current position is updated, a selection telop display screen is then displayed (step ST122. In this state, the user sets whether to take into consideration the facility by performing an operation (step ST123).

Whether a setting showing that the facility is taken into consideration has been made is then checked to see (step ST124). When it is determined in this step ST124 that a setting showing that the facility is taken into consideration has not been made, the route presenting processing in consideration of registration destination facilities is ended. In contrast, when it is determined in step ST124 that a setting showing that the facility is taken into consideration has been made, the facility for which a setting to make a targeted search has been made is then acquired (step ST125). A registration destination facility list is then outputted to the display screen (step ST126). More specifically, the facility service information notification processing unit 17 displays a list of registration destination facilities located in an area surrounding the route to the destination and each providing service information having an unexpired notification period. As a result, the navigation device becomes able to easily set a registration destination facility via which the vehicle will travel.

A selection of a registration destination facility which is taken into consideration is then started (step ST127). In this selection of a registration destination facility, a registration destination facility which is taken into consideration is selected through the user's operation (step ST128). Whether the selection of a registration destination facility which is taken into consideration is completed is then checked to see (step ST129). When it is determined in this step ST129 that the selection of a registration destination facility which is taken into consideration is not completed, the selection in step ST128 is repeated. In contrast, when it is determined in step ST129 that the selection of a registration destination facility which is taken into consideration is completed, whether or not a re-search is performed is then checked to see (step ST130). When it is determined in this step ST130 that no re-search is performed, the route presenting processing in consideration of registration destination facilities is ended. In contrast, when it is determined in step ST130 that a re-search is performed, a display screen of a route which has been re-searched for in consideration of registration destination facilities is outputted (step ST131). After that, the route presenting processing in consideration of registration destination facilities is ended.

Figure 19:
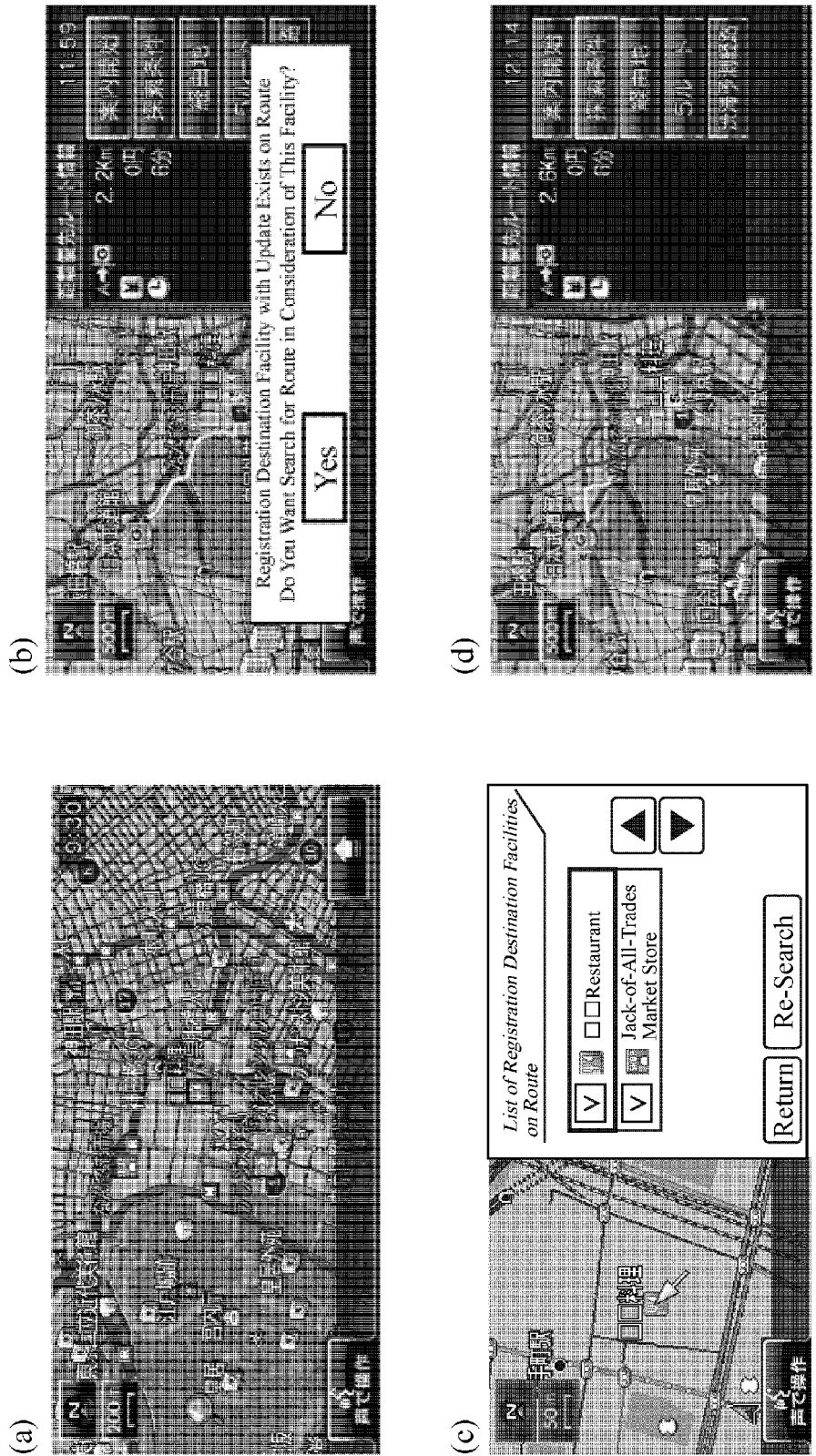
FIG. 19 is the view showing an example of a screen displayed through the presenting processing for presenting a route which is searched for in consideration of registration destination facilities which is carried out by the navigation device in accordance with Embodiment 1 of the present invention.

FIG. 19 is a view showing an example of a screen displayed through the above-mentioned route presenting processing in consideration of registration destination facilities. In the screen shown in FIG. 19(*a*), four detected registration destination facilities each having an update are shown on the map. At this time, when the user sets "Nippon Budokan Hall" as his or her destination, two facilities located in an area surrounding the searched route satisfies the requirements, and a telop as shown in FIG. 19 (*b*) is presented for the user. When the user then selects "yes" in this telop, the registration destination facilities for each of which a setting to make a targeted search for service information has been made are extracted from the data storage unit 10, and a display screen of a list shown in FIG. 19(*c*) is presented for the user. When the user selects a registration destination facility via which he or she desires to travel on this screen and then clicks "Re-search" on the screen to cause the navigation device to perform a re-search, a route shown in FIG. 19 (*d*) which has been searched for in consideration of the registration destination facility is displayed.

As mentioned above, because the navigation device in accordance with Embodiment 1 is constructed in such a way as to perform a predetermined process on service information distributed from a registration destination facility to register the service information in the data storage unit, and display whether or not there is an update in the service information of each registration destination facility on the map according to the set notification condition, the navigation device can easily register and refer to the service information distributed from the registration destination facility.

Industrial Applicability

The present invention can be used for a car navigation device which is mounted in a vehicle and receives various pieces of useful information from surrounding facilities.

The invention claimed is:

1. A navigation device comprising:
a data storage unit for storing data;
a service information reception processing unit for receiving service information at an external registration destination facility with which member registration is made, the service information being distributed from the external registration destination facility;
a service information analyzing processing unit for performing a predetermined process on the service information received by said service information reception processing unit to register the service information in said data storage unit;
a notification condition customization setting unit for setting a notification condition about notification of the service information at the external registration destination facility; and
a facility icon display processing unit for displaying, on a map of a current location and surrounding area of the navigation device, an icon representing a registration destination facility located within an area covered by the displayed map, and for displaying a modified version of the icon on the map in such manner indicating that there is an update in service information at the registration destination facility located within an area covered by the displayed map, according to the notification condition set by said notification condition customization setting unit, said notification condition being satisfied when the service information at the represented registration destination facility has been updated,
wherein the navigation device displays the map on which the icon is displayed in accordance with a navigation function.

2. The navigation device according to claim 1, wherein said navigation device includes a provided information format extracting processing unit for registering a provided information format used for analyzing the service information distributed from the registration destination facility in the data storage unit, and the service information analyzing processing unit processes the service information received by the service information reception processing unit by using the provided information format registered by said provided information format extracting processing unit, and registers the service information in said data storage unit.

3. The navigation device according to claim 1, wherein the facility icon display processing unit calculates a distance from a current position to a surrounding registration destination facility, and does not display icons of registration destination facilities which cannot be displayed with a scale of a map currently being displayed.

4. The navigation device according to claim 1, wherein said navigation device includes a service information control processing unit for deleting and updating service information registered in the data storage unit.

5. The navigation device according to claim 1, wherein said navigation device includes a facility service information notification processing unit for presenting a list of registration destination facilities located in an area surrounding a route to a destination and each providing service information having an unexpired notification period.

6. The navigation device according to claim 1, wherein the notification condition customization setting unit sets a notification condition for each registration destination facility.

7. The navigation device according to claim 1, wherein the service information reception processing unit receives the service information from the external registration destination facility via the Internet.

8. The navigation device according to claim 1, wherein the displayed icon is selectable by a user in order to display information of a commercial service or product currently offered at the external registration destination facility, the information of the commercial service or product being part of the service information received from the external registration destination facility.

* * * * *